(12) United States Patent
Kanno

(10) Patent No.: US 12,038,953 B2
(45) Date of Patent: Jul. 16, 2024

(54) INFORMATION PROCESSING APPARATUS AND INFORMATION PROCESSING METHOD

(71) Applicant: SONY GROUP CORPORATION, Tokyo (JP)

(72) Inventor: Saya Kanno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 196 days.

(21) Appl. No.: 17/621,063

(22) PCT Filed: Jun. 5, 2020

(86) PCT No.: PCT/JP2020/022392
§ 371 (c)(1),
(2) Date: Dec. 20, 2021

(87) PCT Pub. No.: WO2020/261944
PCT Pub. Date: Dec. 30, 2020

(65) Prior Publication Data
US 2022/0350824 A1 Nov. 3, 2022

(30) Foreign Application Priority Data
Jun. 27, 2019 (JP) ................................. 2019-119388

(51) Int. Cl.
*G06F 16/35* (2019.01)
*G06F 16/31* (2019.01)
(Continued)

(52) U.S. Cl.
CPC ............ *G06F 16/322* (2019.01); *G06F 16/35* (2019.01); *G06F 40/242* (2020.01); *G06F 40/30* (2020.01); *G06N 5/02* (2013.01)

(58) Field of Classification Search
CPC ...... G06F 16/322; G06F 16/35; G06F 40/242; G06F 40/30; G06F 16/90332; G06N 5/02
See application file for complete search history.

(56) References Cited

U.S. PATENT DOCUMENTS 10,331,768 B2 * 6/2019 Patil ..................... G06F 40/205
10,594,757 B1 * 3/2020 Shevchenko ........... G06F 17/18
(Continued)

FOREIGN PATENT DOCUMENTS

AU  2015374382 A1  5/2017
BR  112017010222 A2  12/2017
(Continued)

OTHER PUBLICATIONS

International Search Report and Written Opinion of PCT Application No. PCT/JP2020/022392, dated Aug. 4, 2020, 09 pages of ISRWO.

*Primary Examiner* — Merilyn P Nguyen
(74) *Attorney, Agent, or Firm* — CHIP LAW GROUP

(57) ABSTRACT

Automatic expansion of a knowledge information dictionary for speech semantic analysis and generation of responses for a dialogue agent are performed in a favorable manner. Category tags are assigned to each term in input speech for all categories when terms are registered in the knowledge information dictionary. A domain of speech content intended by the input speech is estimated, and terms pertaining to the estimated domain are extracted from the input speech as a phrase of a predetermined entity. A response is generated on the basis of the domain of the speech content intended by the input speech and the phrase of the predetermined entity. When a category tag is not assigned to the phrase of a predetermined entity, the phrase of the predetermined entity is registered for the category corresponding to the predetermined entity in the knowledge information dictionary. The (Continued)

knowledge information dictionary has a hierarchical structure, and the application unit generates the response using the hierarchical structure.

13 Claims, 14 Drawing Sheets

(51) Int. Cl.
  *G06F 40/242* (2020.01)
  *G06F 40/30* (2020.01)
  *G06N 5/02* (2023.01)

(56) References Cited

U.S. PATENT DOCUMENTS

| | | | | |
|---|---|---|---|---|
| 2003/0130837 A1* | 7/2003 | Batchilo | ................ | G06F 40/30 |
| | | | | 707/E17.094 |
| 2007/0016401 A1* | 1/2007 | Ehsani | ................... | G06F 40/55 |
| | | | | 704/9 |
| 2007/0156393 A1* | 7/2007 | Todhunter | ............... | G06F 40/30 |
| | | | | 707/E17.094 |
| 2013/0091139 A1* | 4/2013 | Rajpathak | ............... | G06F 40/30 |
| | | | | 707/740 |
| 2016/0188565 A1 | 6/2016 | Robichaud et al. | | |
| 2016/0260029 A1 | 9/2016 | Gelfenbeyn et al. | | |
| 2018/0260474 A1* | 9/2018 | Surdeanu | .............. | G06F 40/279 |
| 2018/0373796 A1* | 12/2018 | Rathod | ................... | H04W 4/21 |

FOREIGN PATENT DOCUMENTS

| | | |
|---|---|---|
| CA | 2968016 A1 | 7/2016 |
| CN | 107111611 A | 8/2017 |
| EP | 3241125 A2 | 11/2017 |
| JP | 11-045266 A | 2/1999 |
| JP | 2018-506113 A | 3/2018 |
| JP | 2019-012439 A | 1/2019 |
| KR | 10-2017-0099917 A | 9/2017 |
| MX | 2017008583 A | 11/2017 |
| RU | 2017122991 A | 12/2018 |
| WO | 2016/109307 A2 | 7/2016 |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/022392 filed on Jun. 5, 2020, which claims priority benefit of Japanese Patent Application No. JP 2019-119388 filed in the Japan Patent Office on Jun. 27, 2019. Each of the above-referenced applications is hereby incorporated herein by reference in its entirety.

TECHNICAL FIELD

The present technique relates to an information processing apparatus and an information processing method, and particularly relates to an information processing apparatus and an information processing method pertaining to the automatic expansion of knowledge information dictionaries for speech semantic analysis and the generation of responses for dialogue agents.

BACKGROUND ART

For example, PTL 1 discloses the automatic extraction of noun phrases related to search conditions used in document searches, registering the noun phrases in a thesaurus dictionary for searches, using the thesaurus dictionary to expand the search conditions, and the like. Registration in the thesaurus dictionary is performed by extracting noun phrases that correspond to the search conditions from an input search document. Expansion of the search conditions is performed by selecting synonyms corresponding to the search conditions from the thesaurus dictionary.

CITATION LIST

Patent Literature

[PTL 1]
JP H11-045266 A

SUMMARY

Technical Problem

Speech semantic analysis techniques included in dialogue agents use a knowledge information dictionary to assign feature amounts to input speech, on the basis thereof, input speech may be analyzed, response speech may be generated, and so on. However, it is very costly to maintain a knowledge information dictionary manually. Furthermore, the knowledge is updated on a daily basis, and it is therefore difficult to continually maintain up-to-date information.

Methods for automatically updating knowledge information dictionaries include crawling web pages, importing from open databases, and the like. With the former, it is difficult to ensure the accuracy of the information, whereas with the latter, the method is dependent on other parties and a database of the necessary information may therefore not always be present. What is needed is a method that can automatically acquire a knowledge information dictionary while maintaining accuracy.

An object of the present technique is to perform automatic expansion of a knowledge information dictionary for speech semantic analysis and generation of responses for a dialogue agent in a favorable manner.

Solution to Problem

According to an aspect of the present technique, an information processing device includes:
  a tagging unit that assigns a category tag to each of terms in input speech for all of categories when the terms are registered in a knowledge information dictionary;
  a semantic analysis unit that estimates a domain of speech content intended by the input speech and extracts a term pertaining to the estimated domain from the input speech as a phrase of a predetermined entity;
  an application unit that generates a response on the basis of the domain of content of the input speech and the phrase of the predetermined entity; and
  a dictionary expansion unit that, when the category tag is not assigned to the phrase of the predetermined entity, registers the phrase of the predetermined entity for a category corresponding to the predetermined entity in the knowledge information dictionary.

In the present technique, a category tag is assigned by the tagging unit to each of terms in the input speech for all of the categories when the terms are registered in the knowledge information dictionary. The domain of speech content intended by the input speech is estimated, and terms pertaining to the estimated domain are extracted from the input speech as the phrase of the predetermined entity, by the semantic analysis unit. For example, when estimating the domain of the speech content intended by the input speech, the semantic analysis unit may estimate the domain on the basis of the category tag assigned to the term in the input speech.

When a category tag is not assigned to the phrase of a predetermined entity, the phrase of the predetermined entity is registered for the category corresponding to the predetermined entity in the knowledge information dictionary by the dictionary expansion unit. For example, when the application unit can correctly generate the response, the dictionary expansion unit may register the phrase of the predetermined entity. Additionally, for example, the knowledge information dictionary has a hierarchical structure, along with the category corresponding to the predetermined entity in the knowledge information dictionary, the dictionary expansion unit may also register the phrase of the predetermined entity for each of hierarchical categories superordinate to the stated category.

In this manner, in the present technique, when a category tag is not assigned to a phrase of a predetermined entity extracted from input speech, the phrase of the predetermined entity is registered for the category corresponding to the predetermined entity in the knowledge information dictionary. This makes it possible to automatically expand the knowledge information dictionary.

Additionally, another concept of the present technique is an information processing apparatus, including:
  a tagging unit that assigns a category tag to each of terms in input speech for all of categories when the terms are registered in a knowledge information dictionary;
  a semantic analysis unit that estimates a domain of speech content intended by the input speech and extracts a term pertaining to the estimated domain from the input speech as a phrase of a predetermined entity; and an application unit that generates a response on the basis of the domain of content of the input speech and the phrase of the predetermined entity, wherein the knowledge information dictionary has a hierarchical structure, and the application unit generates the response using the hierarchical structure.

In the present technique, a category tag is assigned by the tagging unit to each of terms in the input speech for all of the categories when the terms are registered in the knowledge information dictionary. The domain of speech content intended by the input speech is estimated, and terms pertaining to the estimated domain are extracted from the input speech as the phrase of the predetermined entity, by the semantic analysis unit. The response is generated by the application unit on the basis of the domain and the phrase of the predetermined entity.

For example, when narrowing down content of the response, the application unit may generate the response using information on a category of a hierarchy subordinate to the category indicated by the category tag assigned to the phrase of the predetermined entity. Additionally, for example, when expanding content of the response, the application unit may generate the response using information on a category of a hierarchy superordinate or parallel to the category indicated by the category tag assigned to the phrase of the predetermined entity.

Additionally, for example, when the input speech contains content instructing the content of the response to be narrowed down or expanded, the application unit may generate the response using the hierarchical structure in accordance with the instruction. Additionally, for example, when the input speech does not contain content instructing the content of the response to be narrowed down or expanded, the application unit may generate the response selectively using the hierarchical structure in accordance with whether the input speech is first speech or second speech.

Here, "first speech" refers to speech for which speech semantic analysis can be performed using the input speech alone, such as the user's speech in a one question-one answer dialogue or the user's first speech in a multi-turn dialogue. In addition, "second speech" refers to input speech that cannot undergo speech semantic analysis on its own but can undergo speech semantic analysis by being combined with previous and following speech, the agent's internal circumstances, or the like.

In this case, for example, when the input speech is the first speech, the application unit may generate the response without using the hierarchical structure.

Additionally, in this case, for example, when the input speech is the second speech, the application unit may determine whether to narrow down or expand the content of the response from a difference between a category tag assigned to the first speech and a category tag assigned to the second speech, and generate the response using the hierarchical structure in accordance with a result of the determination.

Additionally, for example, when a category of the same hierarchy is assigned to the first speech and the second speech, the application unit may determine to narrow down the content of the response, and generate the response using information on a category of a hierarchy subordinate to the category indicated by the category tag assigned to the phrase of the predetermined entity. Additionally, for example, when a category of the same hierarchy is not assigned to the first speech and the second speech, the application unit may determine to expand the content of the response, and generate the response using information on a category of a hierarchy superordinate or parallel to the category indicated by the category tag assigned to the phrase of the predetermined entity.

In this manner, according to the present technique, a response is generated using the hierarchical structure of a knowledge information dictionary. This makes it possible for the dialogue agent to generate responses in a favorable manner.

DESCRIPTION OF EMBODIMENTS

Modes for carrying out the present invention (hereinafter referred to as "embodiments") will be described hereinafter. The descriptions will be given in the following order.

1. Embodiment
2. Variations

1. Embodiment

The present technique is assumed to operate on a dialogue agent including an invented semantic analysis engine. The "speech semantic analysis engine" mentioned here refers to a mechanism that takes input speech converted to text by voice recognition (called simply "input speech" hereinafter) as an input and outputs semantic frames.

A "semantic frame" is a frame containing information such as a category of speech content intended by the input speech (called a "domain" hereinafter), phrase information contained in the input speech and required to process the input speech (called an "entity" hereinafter), and the like. Note that an "entity" may also be called a "slot". Entities are associated with domains, and by determining a domain, the entities to be extracted from the input speech are determined automatically.

The present technique may be used in conjunction with a mechanism for extracting specific expressions from text, such as an intrinsic expression extractor, which is necessary for extracting entities. When performing domain estimation, entity extraction, or the like on input speech, it is possible to search for each term in the speech from the knowledge information dictionary, tag the category information of the term if there is relevant information, and use the tagged term as a feature amount during analysis.

Figure 1:
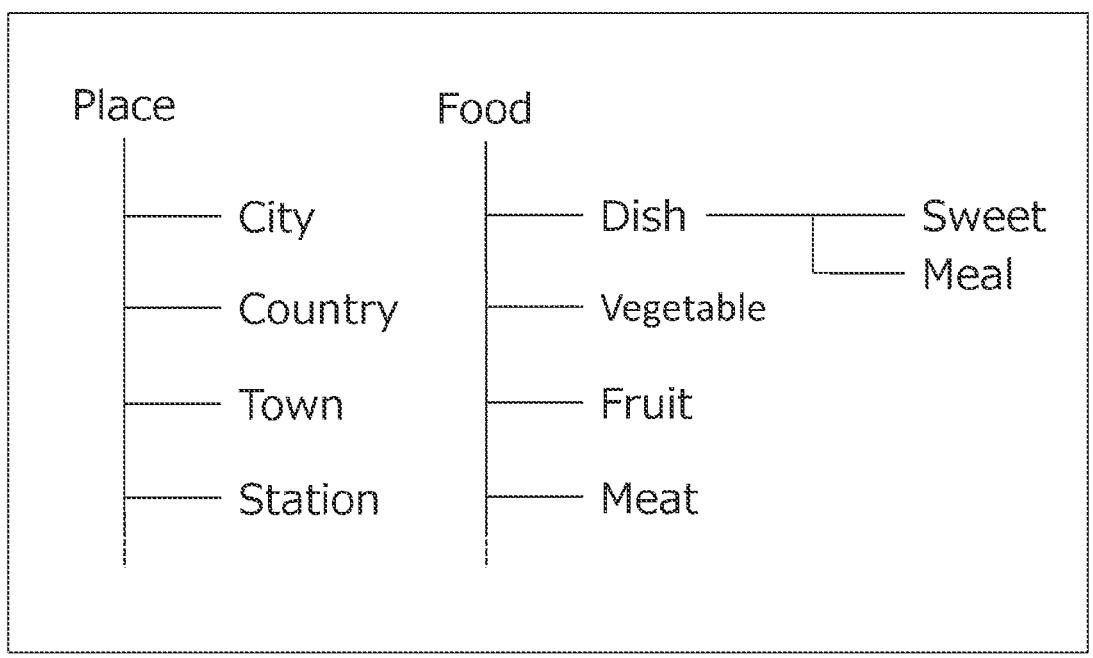
FIG. 1 is a diagram schematically illustrating the structure of a knowledge information dictionary.

FIG. 1 schematically illustrates the structure of a knowledge information dictionary 206. The knowledge information dictionary 206 has a hierarchical structure. For example, under the category "Place", there are parallel categories such as "Country", "City", "Town", "Station", and the like. Although not illustrated, a predetermined number of terms (phrases) are registered under each category.

This knowledge information dictionary can automatically expand registered content. If, when a phrase extracted as an entity does not have a category tag, a target application can correctly process the speech, the phrase is registered for the category corresponding to that entity and a parent category thereof. Through this, the dictionary can be automatically expanded by a user using a dialogue agent provided with the present technique. For this function, it is necessary to have a one-to-one correspondence between entities and categories of the knowledge information dictionary.

It is necessary for the category structure in the knowledge dictionary and the correspondence between each category and entity to be defined in advance by an administrator. This definition is a setting that affects the automatic expansion of the dictionary. When assigning feature amounts to speech, all categories corresponding to each term are assigned as feature amounts. In the knowledge information dictionary, the categories are structured. In the present technique, this category hierarchical structure can also be used when generating a response. In cases where it is difficult to estimate the domain solely from the user's speech, it is possible to estimate the domain on the basis of the category tags assigned to the terms in the speech.

The dialogue agent assumed by the present technique can accept not only one question-one answer dialogue, but also multi-turn dialogue. Here, speech for which speech semantic analysis can be performed using the input speech alone, such as the user's speech in a one question-one answer dialogue or the user's first speech in a multi-turn dialogue, will be called "first speech". In addition, input speech that cannot undergo speech semantic analysis on its own but can undergo speech semantic analysis by being combined with previous and following speech, the agent's internal circumstances, and the like will be called "second speech".

All of these functions of the present technique can be run either on the server side or embedded locally.

The following will describe in detail basic functions of the present technique, which are (1) assigning category tags (feature amounts) to input speech, (2) a knowledge information dictionary automatic expansion function, and (3) generating responses using a hierarchical structure.

Figure 2:
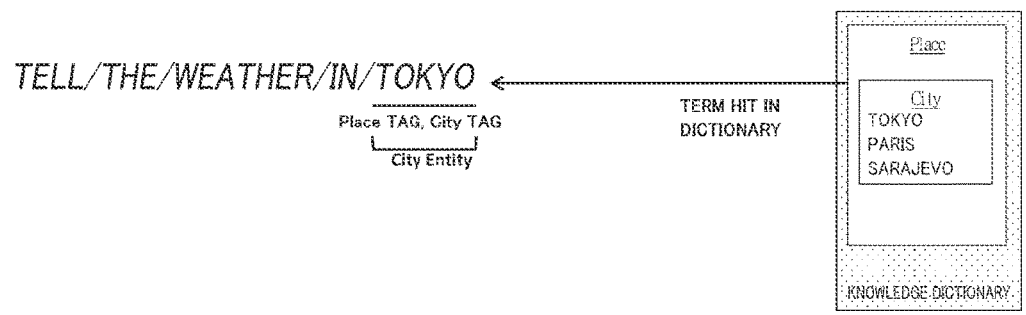
FIG. 2 is a diagram illustrating the assignment of category tags to input speech through a knowledge information dictionary.

Assignment of Category Tags to Input Speech through Knowledge Information Dictionary The assignment of category tags to input speech through the knowledge information dictionary will be described. A phrase A in the input speech is searched for in the knowledge information dictionary, and if a corresponding term is registered, a category tag is assigned for all categories in which the term is registered. For example, as illustrated in FIG. 2, if the term "Tokyo" is found in a Place category and a City category, a Place tag and a City tag are assigned to "Tokyo" in the speech, and these are used as feature amounts in the analysis.

In the present technique, phrases across multiple consecutive morphemes are searched for, and the result having the longest match is ultimately output. For example, if the character string "Tokyo Tower" (morpheme decomposed as "Tokyo/Tower") is entered, and the terms "Tokyo", "Tower", and "Tokyo Tower" are all present in dictionary, "Tokyo Tower" will be the longest matching search result, and "Tokyo Tower" will be assigned the category tag. The search in the knowledge information dictionary takes into account morphological phrase breaks. Accordingly, in the case of the example in FIG. 2, even if the term "Kyo" is registered in the knowledge information dictionary, it will not be assigned a category tag.

"Knowledge Information Dictionary Automatic Expansion Function" The knowledge information dictionary automatic expansion function will be described. If an entity (a class of expressions to be extracted) and a category are in one-to-one correspondence with each other, when the phrase A extracted as an entity X is not registered in a category α (i.e., is not assigned a category tag α) and the agent is able to complete a specific operation, the phrase A can be registered in the dictionary of category α. The feature A ∈ α can then be applied to all speech, regardless of intent or entity. If a hierarchical relationship "category ω is a superordinate concept of category α" exists between ω and α, then the phrase A registered in the dictionary of category α is automatically registered in the dictionary of category ω as well.

Figure 3:
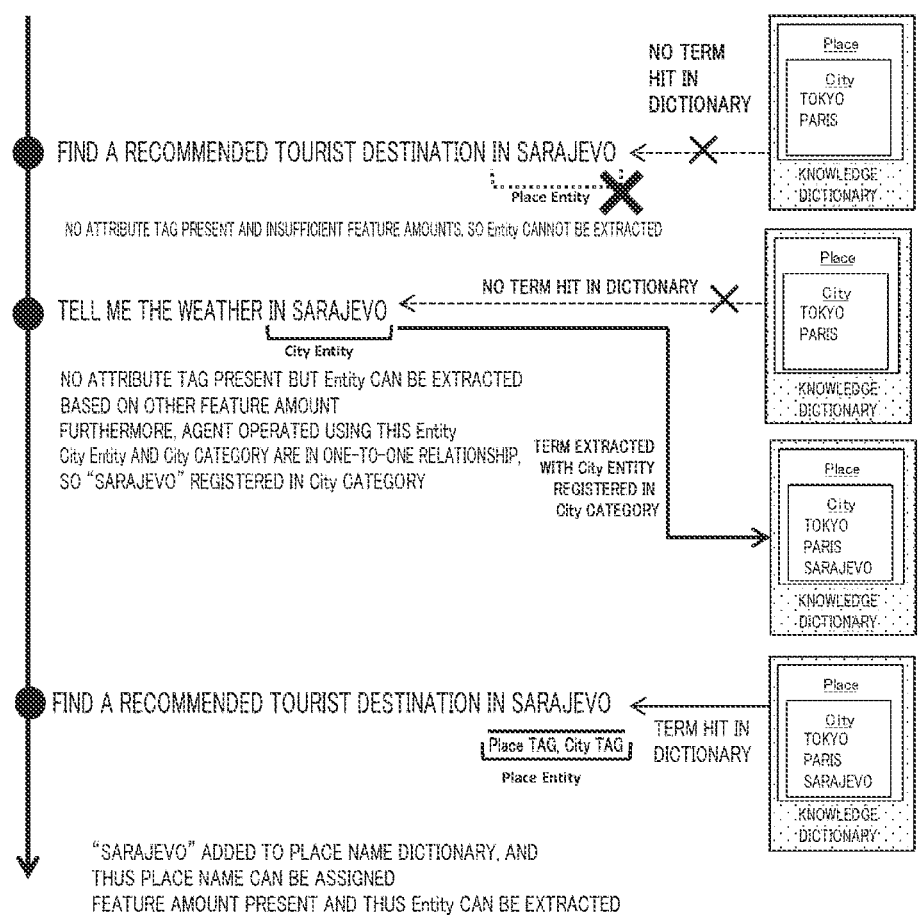
FIG. 3 is a diagram illustrating a knowledge information dictionary automatic expansion function.

For example, as illustrated in FIG. 3, if the term "Sarajevo" is not registered in the dictionary, it is impossible to assign a category tag to the term "Sarajevo". However, if "Sarajevo" is extracted by a City entity and the agent is able to complete the action for that speech, the term "Sarajevo" will be registered in the dictionary as the term of the City category to which the City entity corresponds. Furthermore, since the City category is a child category of the Place category, "Sarajevo" is also registered as a term of the Place category at the same time.

"Response Generation Using Hierarchical Structure of Knowledge Information Dictionary"

Response generation using the hierarchical structure of a knowledge information dictionary will be described. The agent can generate a response on the basis of the category tag assigned to the user's input speech. For the phrase A extracted as the entity X associated with the category a, information on the parent category or child category of the category α is also obtained at the same time, and this hierarchical structure is utilized as information and feature amounts when making a response.

How to utilize the hierarchical structure when generating a response can be determined depending on the input speech and the immediately-preceding context. In the present technique, child category information of the stated category is utilized when the analysis or response content is to be narrowed down. The parent category information or parallel category information of the stated category is used when expanding the scope of analysis or response content.

Whether to narrow down or expand the analysis or response content may or may not be explicitly instructed in the input speech. If the input speech contains explicit instructions for narrowing down or expanding the analysis content, the hierarchical structure is used to generate a response according to those instructions. If the input speech does not contain any instructions for narrowing down or expanding the analysis content, and if the input speech is the first speech, a response is generated without using the hierarchical structure.

If the input speech does not contain any instructions for narrowing down or expanding the analysis or response content, and if the input speech is the second speech, a difference between the category tag assigned to the first speech and the category tag assigned to the second speech is used to determine whether the analysis content should be narrowed down or expanded. If the same hierarchical category tag is assigned to the first speech and the second speech, the child category information of the corresponding category is utilized to narrow down the analysis. If the same hierarchical category tag is not assigned to the first speech and the second speech, the parent category information or parallel category information is utilized to expand the analysis content.

Figure 4:
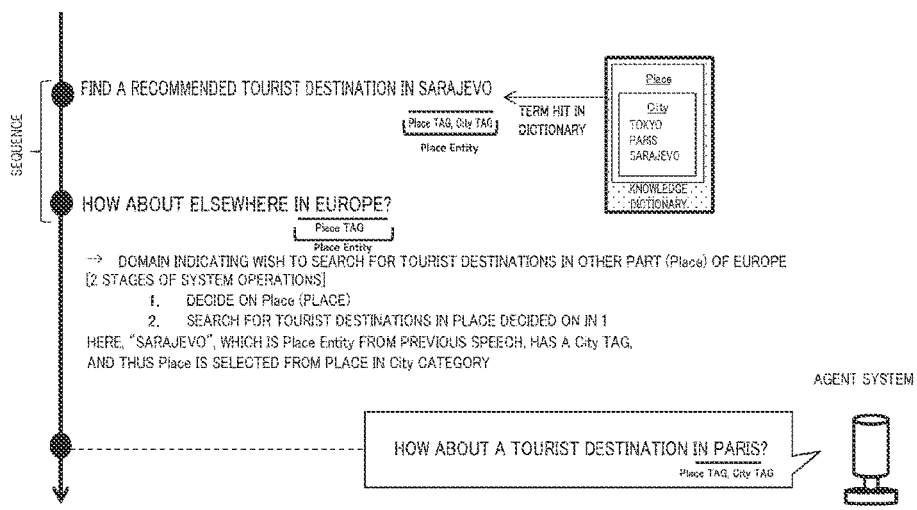
FIG. 4 is a diagram illustrating response generation using a hierarchical structure of a knowledge information dictionary.

For example, in a multi-turn dialogue that utilizes speech history as illustrated in FIG. 4 (speech in which the user's first speech, "Find a recommended tourist destination in Sarajevo," is followed by a system response, and based thereon, the user's second speech is "What about elsewhere in Europe?"), the hierarchical structure of the dictionary makes it possible to select the most effective response.

In the case of the example in FIG. 4, the phrase "Sarajevo" extracted by the Place entity is registered in the City category, and the Place category is the parent category thereof; in the second speech, "Europe" extracted by the Place entity is registered in the Place category. In the example in FIG. 4, the input speech does not contain any explicit support for narrowing down or expanding the analysis content. However, because the first speech and the second speech are assigned Place category tags that are in the same hierarchy, the system can select the place to be suggested as a response from the information registered in the City category, which is a child category for narrowing down the analysis content.

"Assigning Category Tags with One Attribute"

An example of where a category tag having one attribute is assigned will be described next. In the example in FIG. 5, in the input speech "Tell me the weather in Tokyo," the term "Tokyo" is present in the Place category and the City category, and thus the term "Tokyo" is assigned a Place tag and a City tag. In this case, the City category is at a lower level of the hierarchy than the Place category, and thus these two categories belong to one attribute; the term "Tokyo" is thus assigned a category tag that belongs to one attribute.

Figure 5:
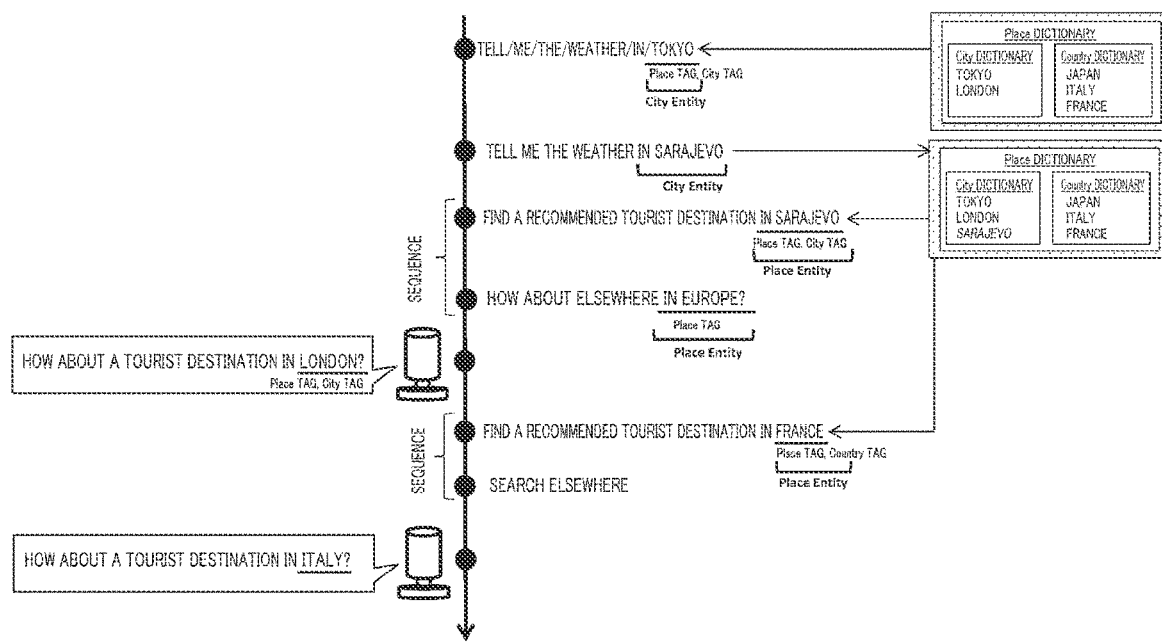
FIG. 5 is a diagram illustrating the assignment of a category tag for one attribute.

In the example in FIG. 5, in the input speech "Tell me the weather in Sarajevo," no category tag is assigned to the term "Sarajevo" because the term "Sarajevo" is not registered in the dictionary. However, if the term "Sarajevo" is extracted as a phrase of a City entity and the agent is able to complete the action for that speech, the term "Sarajevo" will be registered in the dictionary as a term of the City category to which the City entity corresponds, and furthermore as a term of the Place category superordinate thereto.

Then, in the input speech "Find a recommended tourist destination in Sarajevo" (the first speech), the term "Sarajevo" is extracted as a Place entity phrase, and a Place tag and a City tag are assigned to the term "Sarajevo". Then, in the input speech "What about elsewhere in Europe?" (the second speech), the term "Europe" is extracted as a Place entity phrase and a Place tag is assigned thereto.

In this case, the input speech does not contain any instructions for narrowing down or expanding the analysis or response content, and the difference between the category tag assigned to the first speech and the category tag assigned to the second speech is used to determine whether to narrow down or expand the analysis content. In this case, because the first speech and the second speech are assigned the same hierarchical category tag, i.e., the Place tag, the child category information of that category, i.e., the City category, is utilized to generate a response in order to narrow down the analysis or response content. For example, a response such as "Would you like to see tourist destinations in London?" is generated.

Later, in the input speech "Find a recommended tourist destination in France" (the first speech), the term "France" is extracted as a Place entity phrase, and a Place tag and a Country tag are assigned to the term "France". Then, in the input speech of "look elsewhere" (the second speech), there is no term to be extracted as a Place entity phrase.

In this case, because the first speech and the second speech are not assigned the same hierarchical category tag, the parent category information or parallel category information is utilized to generate a response in order to narrow down the analysis or response content. For example, a response such as "Would you like to see tourist destinations in Italy?" is generated.

"Assigning Category Tags with Plurality of Attributes"

Assigning category tags with a plurality of attributes will be described. First, a case where the domain "product purchase" is prepared for an action of purchasing will be described.

Figure 6:
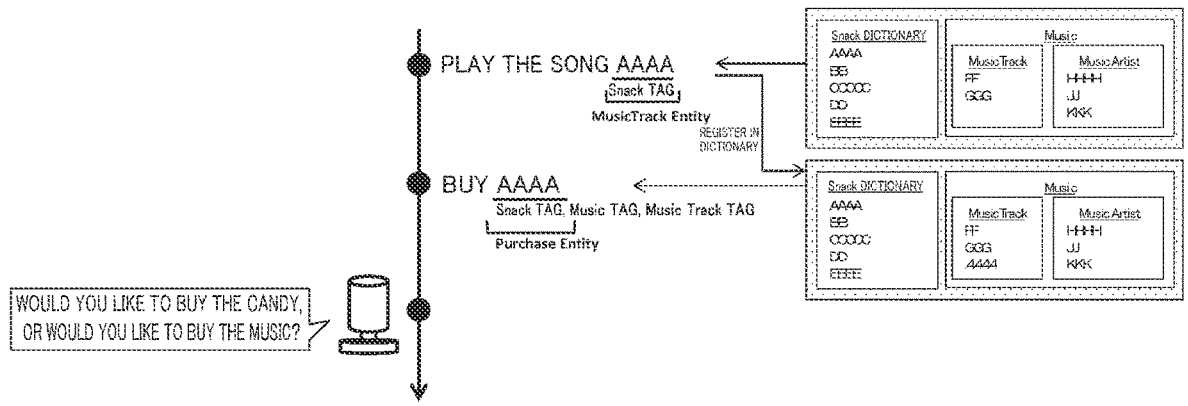
FIG. 6 is a diagram illustrating the assignment of category tags for a plurality of attributes.

In the example illustrated in FIG. 6, in a state where the term "AAAA" is registered in a Snack category, the term "AAAA" is extracted as a phrase of a Music Track entity by input speech "Play the song AAAA", which is a Music Playback domain, and a Snack tag is assigned to the term "AAAA".

If the agent is able to complete the action for this speech, the term "AAAA" is registered as a term of a Music Track category and the superordinate Music category, as shown in the drawing, resulting in a state where the term "AAAA" is registered in the Music category, the Music Track category, and the Snack category.

At this time, when new speech "Buy AAAA", which corresponds to a Product Purchase domain, is input, the system can extract the term "AAAA" as a Purchase entity phrase using the tag information assigned to "AAAA" as a feature amount. It is also possible to generate a response that confirms with the user whether the "AAAA" to be purchased is candy or music on the basis of the tag information assigned to "AAAA". For example, a response such as "Would you like to buy the candy, or would you like to buy the music?" is generated.

Figure 7:
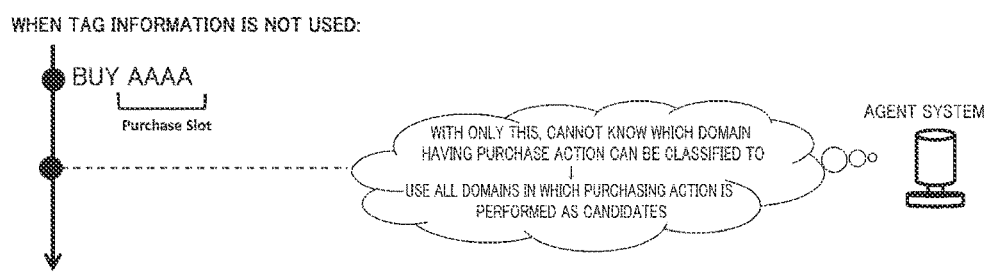
FIG. 7 is a diagram illustrating a case where a plurality of domains are prepared for an action of purchasing and tag information is not used.

Next, a case where a plurality of domains are prepared for the action of purchasing, such as purchasing food, music, video, books, and the like, will be described. If the present technique is not applied, as illustrated in FIG. 7, it may be difficult to generate a response that is easy for the user to understand, because information about what "AAAA" refers to is not available, and all domains in which purchase actions are performed are candidates.

Figure 8:
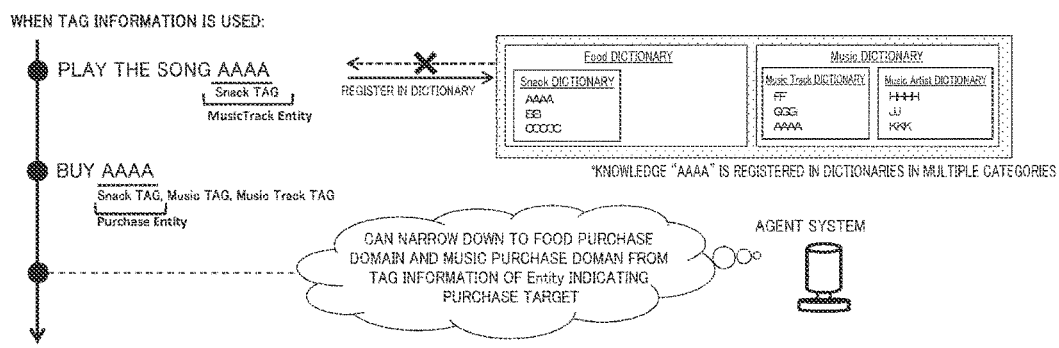
FIG. 8 is a diagram illustrating a case where a plurality of domains are prepared for an action of purchasing and tag information is used.

When the present technique, as illustrated in FIG. 8, the tag assigned to "AAAA" serves as a feature amount, which makes it possible to narrow down the domain. In this case, in the speech "Buy AAAA", the term "AAAA" is extracted as a Purchase entity phrase, and the Snack tag, the Music tag, and the Music Track tag are assigned to the term "AAAA". This makes it possible for the system to narrow down the purchase target to a Food Purchase domain and a Music Purchase domain on the basis of the tag information of the Purchase entity indicating the purchase target.

[Example of Configuration of Information Processing System]

Figure 9:
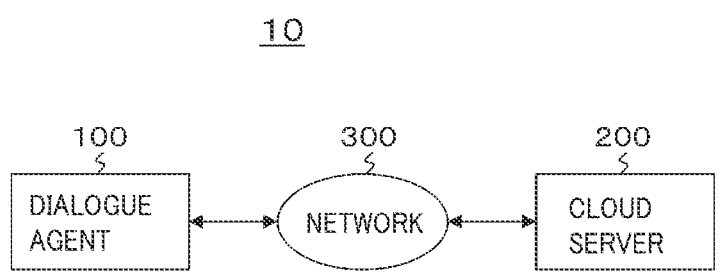
FIG. 9 is a block diagram illustrating an example of the configuration of an information processing system serving as an embodiment.

FIG. 9 is a block diagram illustrating an example of the configuration of an information processing system 10 serving as an embodiment. This information processing system 10 is configured such that a dialogue agent 100 and a cloud server 200 are connected over a network 300 such as the Internet.

The dialogue agent 100 has a conversation with the user. The dialogue agent 100 sends the data of the user's input speech to the cloud server 200 over the network 300. The cloud server 200 processes the data of the input speech, generates response information, and sends the response information to the dialogue agent 100 over the network 300. The dialogue agent 100 outputs audio output, screen output, or the like to the user on the basis of the response information.

Here, the data of the user's input speech may be voice data obtained by a microphone or text data obtained by performing voice recognition processing thereon, or it may be text data obtained from an input operation made by the user. The response information is, for example, text data, and when performing audio output, the dialogue agent 100 convers the text data into voice data. In this embodiment, the data of the user's input speech is, for example, voice data obtained by a microphone.

"Example of Configuration of Dialogue Agent"

Figure 10:
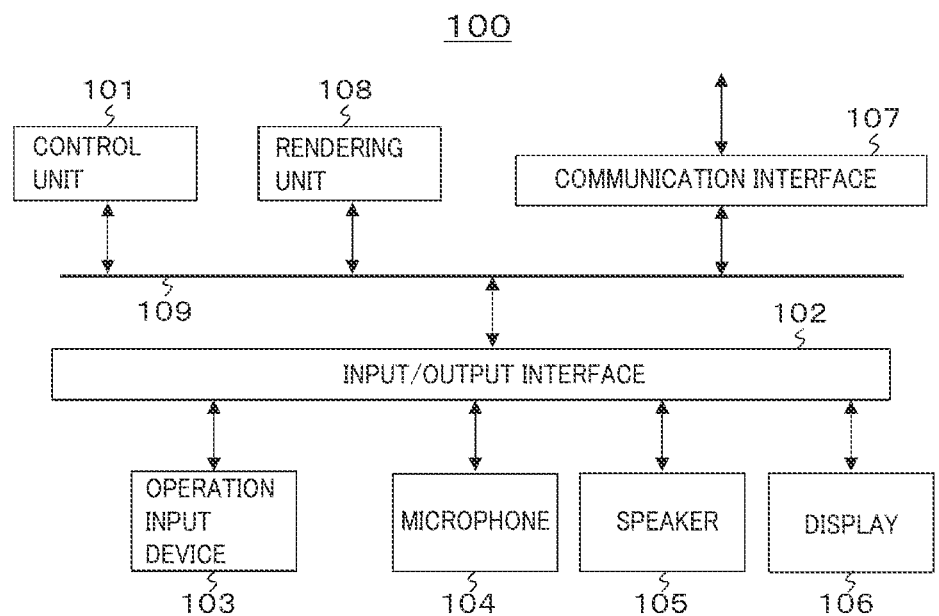
FIG. 10 is a block diagram illustrating an example of the configuration of a dialogue agent.

FIG. 10 illustrates an example of the dialogue agent 100. The dialogue agent 100 includes a control unit 101, an input/output interface 102, an operation input device 103, a microphone 104, a speaker 105, a display 106, a communication interface 107, and a rendering unit 108. The control unit 101, the input/output interface 102, the communication interface 107, and the rendering unit 108 are connected to a bus 109.

The control unit 101 includes a Central Processing Unit (CPU), Read Only Memory (ROM), Random access memory (RAM), and the like, and controls the operations of each unit of the dialogue agent 100. The input/output interface 102 connects the operation input device 103, the microphone 104, the speaker 105, and the display 106. The operation input device 103 constitutes an operation unit for the user of the dialogue agent 100 to perform various operation inputs.

The communication interface 107 communicates with the cloud server 200 over the network 300. This communication interface 107 transmits the voice data obtained by the microphone 104 to the cloud server 200. This communication interface 107 also receives the response information from the cloud server 200.

The rendering unit 108 executes rendering (sound effects, voice synthesis, animation, and the like) on the basis of the response information sent from the cloud server 200, and supplies a generated audio signal to the speaker 105 and a generated video signal to the display 106. The display 106 may be a projector.

"Example of Configuration of Cloud Server"

The cloud server 200 processes the input speech data sent from the dialogue agent 100, generates the response information, and sends the response information back to the dialogue agent 100. The cloud server 200 includes a speech semantic analysis engine (speech semantic analysis unit).

Figure 11:
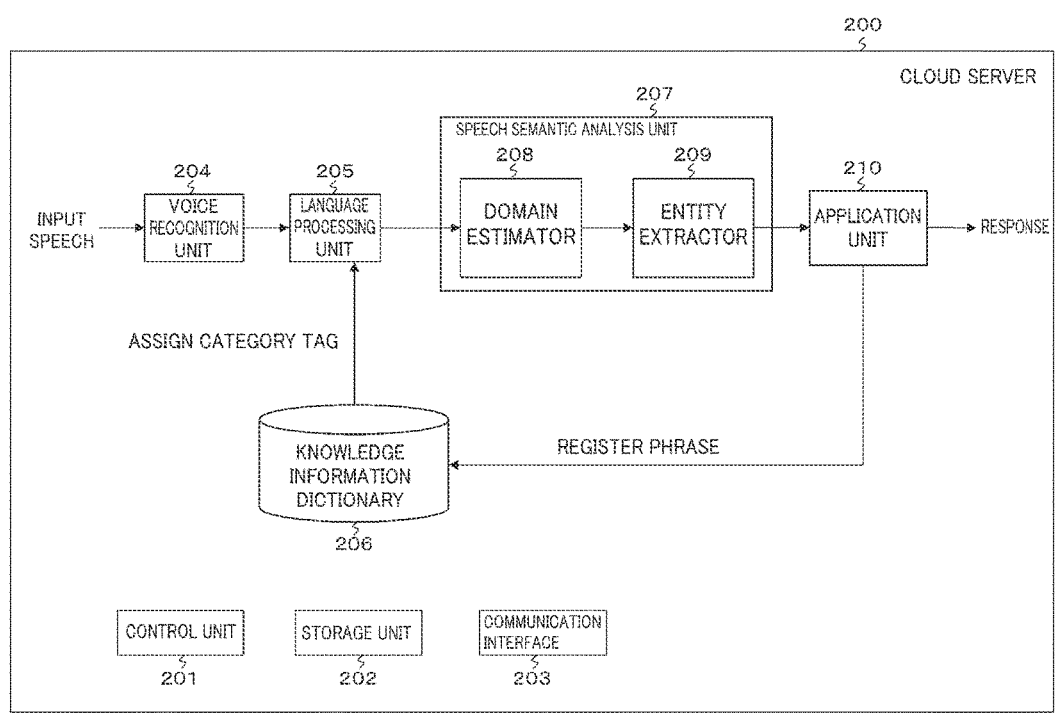
FIG. 11 is a block diagram illustrating an example of the configuration of a cloud server.

FIG. 11 illustrates an example of the configuration of the cloud server 200. This cloud server 200 includes a control unit 201, a storage unit 202, a communication interface 203, a voice recognition unit 204, a language processing unit 205, the knowledge information dictionary 206, a speech semantic analysis unit 207, and an application unit 210.

The control unit 201 includes a Central Processing Unit (CPU), Read Only Memory (ROM), Random access memory (RAM), and the like, and controls the operations of each unit of the cloud server 200. The storage unit 202 is constituted by semiconductor memory, a hard disk, or the like. This storage unit 202 also contains the knowledge information dictionary 206.

The communication interface 203 communicates with the dialogue agent 100 over the network 300. This communication interface 203 receives the voice data of the input speech sent from the dialogue agent 100. The communication interface 203 also sends response information for responding to the user to the dialogue agent 100 over the network 300.

The voice recognition unit 204 applies voice recognition processing to the voice data of the input speech and converts the voice into text. The language processing unit 205 analyzes the text obtained by the voice recognition unit 204 to obtain information such as terms (words), parts of speech, dependencies, and the like. The language processing unit 205 assigns category tags to each term in the input speech for all categories when the terms are registered in the knowledge information dictionary 206. In this sense, the language processing unit 205 also constitutes a tagging unit.

The speech semantic analysis unit 207 includes a domain estimator 208 and an entity extractor 209. The domain estimator 208 estimates the domain (category) of the speech content intended by the input speech. In this case, the domain estimator 208 estimates the domain on the basis of, for example, the category tags assigned to the terms in the input speech. The entity extractor 209 extracts terms pertaining to the domain estimated by the domain estimator 208 as a phrase for a predetermined entity. This phrase is required for processing the input speech by the application unit 210 (described later). The speech semantic analysis unit 207 outputs a speech frame containing information such as the domain estimated by the domain estimator 208, the phrase of the predetermined entity extracted by the entity extractor 209, and the like.

The application unit 210 generates a response on the basis of the speech frame (including information such as the domain and the phrases of the predetermined entity), which is the output of the speech semantic analysis unit 207. In this case, the application unit 210 generates a response utilizing the hierarchical structure of the knowledge information dictionary 206 as described above.

When the phrase of the predetermined entity is not assigned a category tag and the application operation is successfully completed, the application unit 210 registers the phrase of the predetermined entity for the category corresponding to that predetermined entity in the knowledge information dictionary 206. In this case, along with the category corresponding to the predetermined entity, the phrase of the predetermined entity is also registered for each hierarchical category superordinate to the stated category. In this sense, the application unit 210 also constitutes a dictionary expansion unit. A configuration is also conceivable in which the registration to the knowledge information dictionary 206 is performed without determining a condition that the application operation has been completed successfully.

Figure 12:
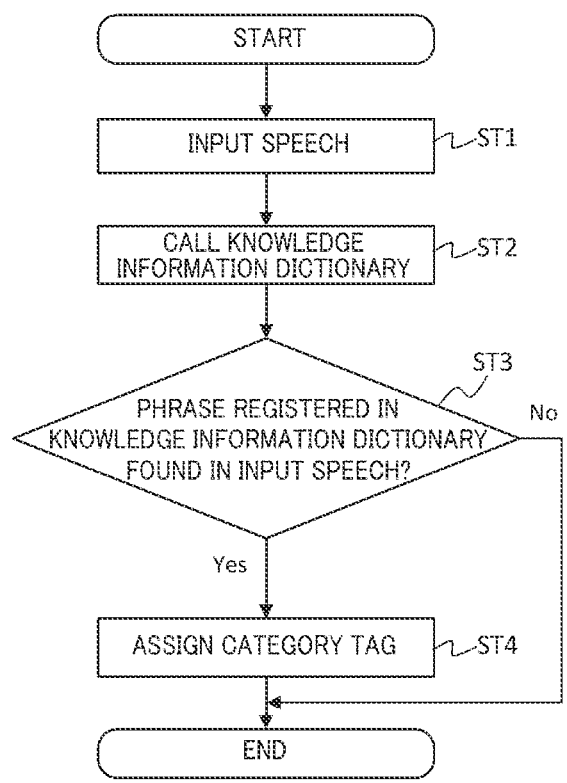
FIG. 12 is a flowchart illustrating an example of a processing sequence for assigning a category tag to input speech through a knowledge information dictionary, performed in a cloud server.

The flowchart in FIG. 12 illustrates an example of a processing sequence for assigning a category tag to input speech through the knowledge information dictionary 206, performed in the cloud server 200. When there is input speech in step ST1, the cloud server 200 calls the knowledge information dictionary 206 in step ST2.

Next, in step ST3, the cloud server 200 determines whether the phrase (term) registered in the knowledge information dictionary 206 is found in the input speech. If not found, the cloud server 200 does not assign a category tag to the input speech. On the other hand, if found, the cloud server 200 assigns a category tag of the corresponding category to the term found in the input speech in step ST4. In this case, if there are a plurality of corresponding categories, a category tag is assigned for all of the categories.

Figure 13:
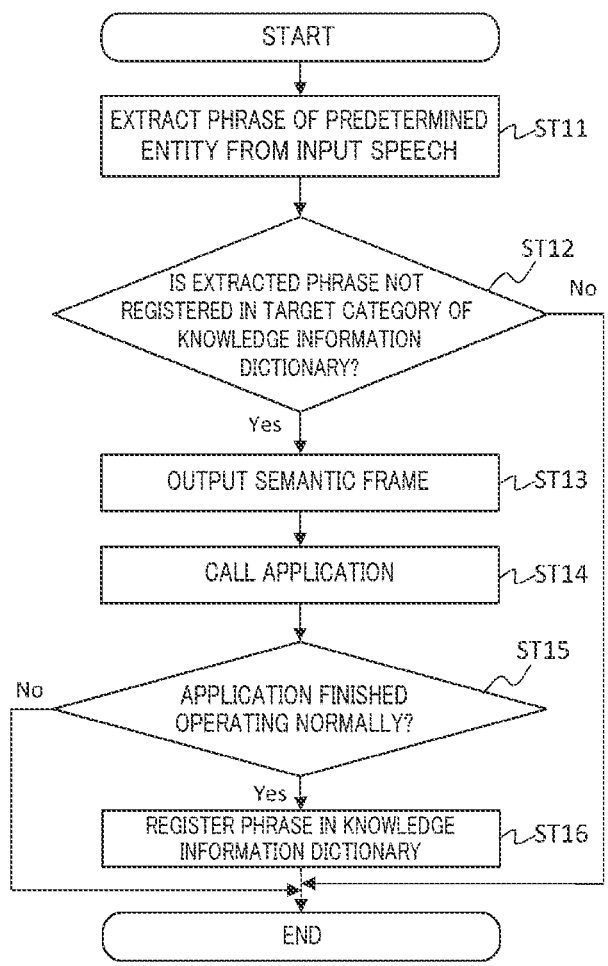
FIG. 13 is a flowchart illustrating an example of a processing sequence for automatically expanding a knowledge information dictionary, performed in a cloud server.

The flowchart in FIG. 13 illustrates an example of a processing sequence for automatically expanding the knowledge information dictionary 206, performed in the cloud server 200. The cloud server 200 extracts the phrase of the predetermined entity from the input speech in step ST11. Next, in step ST12, the cloud server 200 determines whether the extracted phrase is registered in the target category of the knowledge information dictionary 206. For example, when the phrase is not tagged with the target category thereof, it can be determined that the phrase is not registered in the target category in the knowledge information dictionary 206.

If the phrase is registered, the cloud server 200 does not perform the processing for registering the phrase in the target category thereof. On the other hand, if the phrase is not registered, the cloud server 200 outputs a semantic frame from the speech semantic analysis unit 207 in step ST13, and calls an application in the application unit 210 in step ST14 to cause the application to operate.

Next, in step ST15, the cloud server 200 determines whether the application has completed its operations normally. If the operations are not completed normally, the cloud server 200 does not perform the processing for registering the phrase of the predetermined entity extracted from the input speech in the target category. On the other hand, if the operations are completed normally, the cloud server 200 registers the phrase in the target category in the knowledge information dictionary 206 in step ST16.

Figure 14:
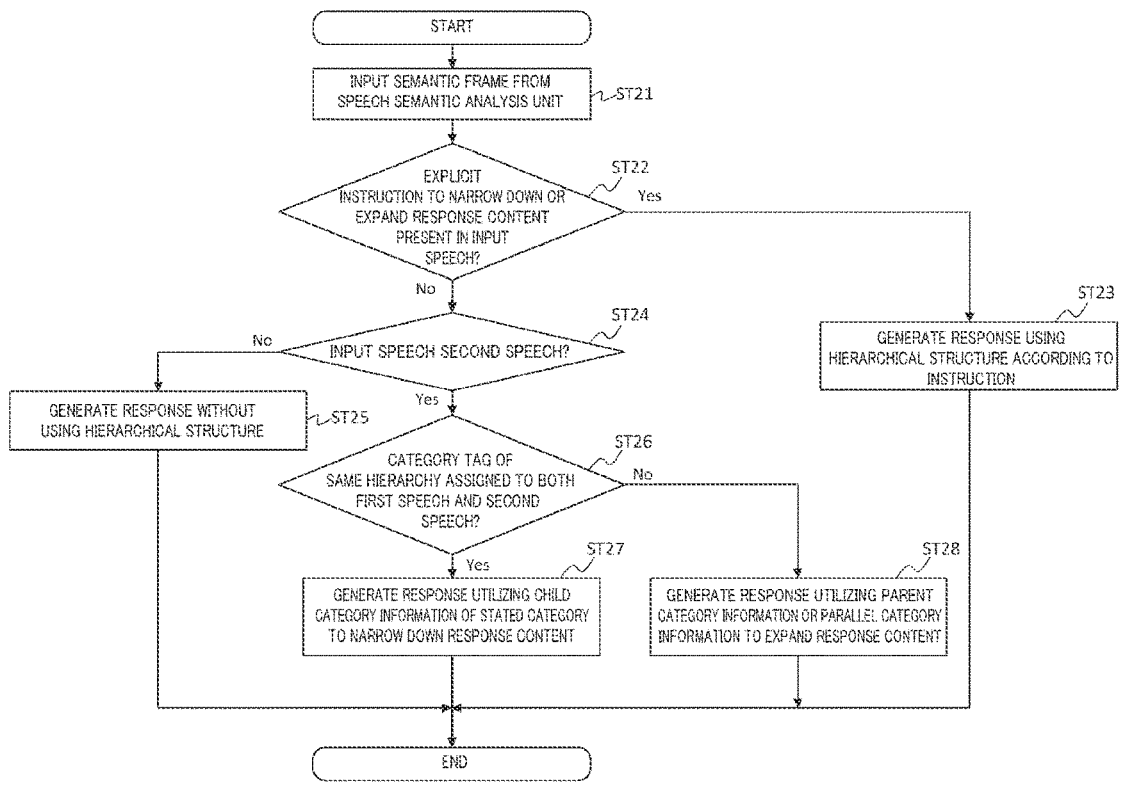
FIG. 14 is a flowchart illustrating an example of a processing sequence for generating a response using the hierarchical structure of a knowledge information dictionary, performed in an application unit of a cloud server.

The flowchart in FIG. 14 illustrates an example of a processing sequence for generating a response using the hierarchical structure of the knowledge information dictionary 206, performed in the application unit 210 of the cloud server 200. The application unit 210 inputs the semantic frame from the speech semantic analysis unit 207 in step ST21.

Next, in step ST22, the application unit 210 determines whether the input speech clearly instructs the response (analysis) content to be narrowed down or expanded. If there is an explicit instruction, the application unit 210 uses the hierarchical structure to generate a response according to the instruction in step ST23.

If there is no explicit instruction in step ST22, the application unit 210 determines whether the input speech is the second speech in step ST24. If the input speech is not the second speech, i.e., is the first speech, the application unit 210 generates a response without using the hierarchical structure in step ST25.

If the input speech is the second speech in step ST24, the application unit 210 determines in step ST26 whether category tags of the same hierarchy are assigned to the first speech and the second speech. If category tags of the same hierarchy are assigned, in step ST27, the application unit 210 generates a response utilizing the child category information of that category in order to narrow down the response content.

If a category tag of the same hierarchy is not assigned in step ST26, in step ST28, the application unit 210 generates a response utilizing the parent category information or parallel category information in order to expand the response content.

As explained above, in the information processing system 10 illustrated in FIG. 9, when a category tag is not assigned to a phrase of a predetermined entity extracted from input speech, the phrase of the predetermined entity is registered for the category corresponding to the predetermined entity in the knowledge information dictionary 206. This makes it possible to automatically expand the knowledge information dictionary 206 without any effort on the part of the user.

In addition, in the information processing system 10 illustrated in FIG. 9, the hierarchical structure of the knowledge information dictionary 206 is used to generate a response. This makes it possible for the dialogue agent to generate responses in a favorable manner.

In the information processing system 10 illustrated in FIG. 9, the process of response generation is performed by the cloud server 200, but it is easy to conceive of a configuration in which some or all of the above-mentioned functions of the cloud server 200 are performed within the dialogue agent 100.

Figure 15:
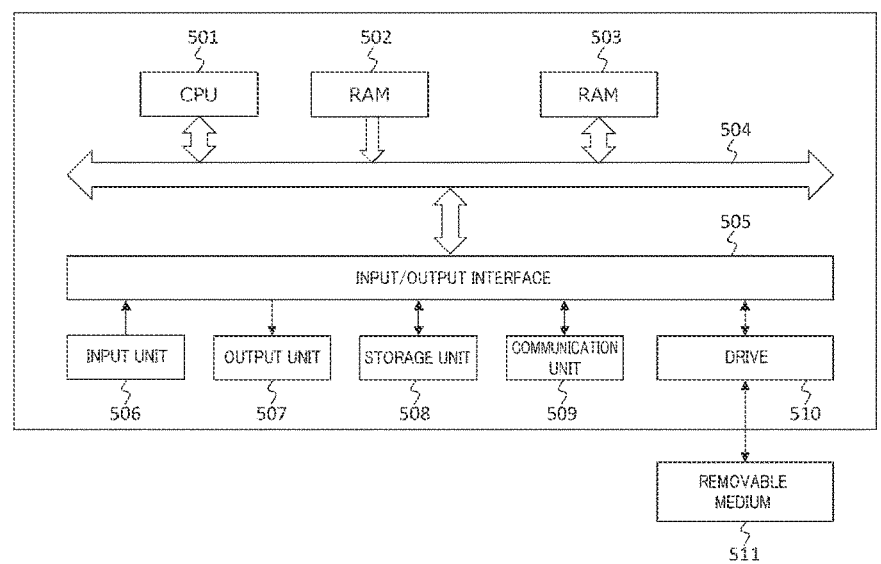
FIG. 15 is a block diagram illustrating an example of the hardware configuration of a computer that executes a series of processing in a cloud server through a program.

FIG. 15 is a block diagram illustrating an example of the hardware configuration of a computer that executes a series of processing in the above-described cloud server 200 through a program.

In the computer, a central processing unit (CPU) 501, read only memory (ROM) 502, and random access memory (RAM) 503 are connected to each other by a bus 504. An input/output interface 505 is further connected to the bus 504. An input unit 506, an output unit 507, a storage unit 508, a communication unit 509, and a drive 510 are connected to the input/output interface 505.

The input unit 506 is a keyboard, a mouse, a microphone, or the like. The output unit 507 is a display, a speaker, or the like. The storage unit 508 is a hard disk, non-volatile memory, or the like. The communication unit 509 is a network interface or the like. The drive 510 drives a removable medium 511 such as a magnetic disk, an optical disc, a magneto-optical disk, or semiconductor memory.

In the computer that has the above configuration, for example, the CPU 501 performs the above-described series of processes by loading a program stored in the storage unit 508 to the RAM 503 via the input/output interface 505 and the bus 504 and executing the program.

The program executed by the computer (the CPU 501) can be recorded on, for example, the removable medium 511 serving as a package medium for supply. The program can be supplied via a wired or wireless transfer medium such as a local area network, the Internet, or digital satellite broadcasting.

In the computer, by mounting the removable medium 511 on the drive 510, it is possible to install the program in the storage unit 508 via the input/output interface 505. The program can be received by the communication unit 509 via a wired or wireless transfer medium to be installed in the storage unit 508. In addition, the program can be installed in advance in the ROM 502 or the storage unit 508.

The program executed by the computer may be a program that performs processes chronologically in the procedure described in the present specification or may be a program that performs a process at a necessary timing such as in parallel or upon being called.

2. Variations

Although preferred embodiments of the present disclosure have been described in detail with reference to the accompanying drawings, the technical scope of the present disclosure is not limited to these examples. It should be apparent to those skilled in the art in the technical fields of the present disclosure that various examples of changes or modifications can be made within the scope of the technical spirit described in the claims and are, of course, to be construed as falling within the technical scope of the present disclosure.

Further, the effects described in the present specification are merely explanatory or exemplary and are not intended as limiting. That is, the techniques according to the present disclosure may exhibit other effects apparent to those skilled in the art from the description in the present specification, in addition to or in place of the above effects.

The present technique can be configured as follows.

(1) An information processing apparatus, including:
a tagging unit that assigns a category tag to each of terms in input speech for all of categories when the terms are registered in a knowledge information dictionary;
a semantic analysis unit that estimates a domain of speech content intended by the input speech and extracts a term pertaining to the estimated domain from the input speech as a phrase of a predetermined entity;
an application unit that generates a response on the basis of the domain and the phrase of the predetermined entity; and
a dictionary expansion unit that, when a category tag is not assigned to the phrase of the predetermined entity, registers the phrase of the predetermined entity for a category corresponding to the predetermined entity in the knowledge information dictionary.

(2) The information processing apparatus according to (1),
wherein when estimating the domain of the speech content intended by the input speech, the semantic analysis unit estimates the domain on the basis of the category tag assigned to the term in the input speech.

(3) The information processing apparatus according to (1) or (2),
wherein when the application unit can correctly generate the response, the dictionary expansion unit registers the phrase of the predetermined entity.

(4) The information processing apparatus according to any one of (1) to (3),
wherein the knowledge information dictionary has a hierarchical structure, and along with the category corresponding to the predetermined entity in the knowledge information dictionary, the dictionary expansion unit also registers the phrase of the predetermined entity for each of hierarchical categories superordinate to the stated category.

(5) An information processing method, including:
assigning a category tag to each of terms in input speech for all of categories when the terms are registered in a knowledge information dictionary;
estimating a domain of speech content intended by the input speech and extracting a term pertaining to the estimated domain from the input speech as a phrase of a predetermined entity;
generating a response on the basis of the domain and the phrase of the predetermined entity; and
when a category tag is not assigned to the phrase of the predetermined entity, registering the phrase of the predetermined entity for a category corresponding to the predetermined entity in the knowledge information dictionary.

(6) An information processing apparatus, including:
a tagging unit that assigns a category tag to each of terms in input speech for all of categories when the terms are registered in a knowledge information dictionary;
a semantic analysis unit that estimates a domain of speech content intended by the input speech and extracts a term pertaining to the estimated domain from the input speech as a phrase of a predetermined entity; and
an application unit that generates a response on the basis of the domain and the phrase of the predetermined entity,
wherein the knowledge information dictionary has a hierarchical structure, and the application unit generates the response using the hierarchical structure.

(7) The information processing apparatus according to (6),
wherein when narrowing down content of the response, the application unit generates the response using information on a category of a hierarchy subordinate to the category indicated by the category tag assigned to the phrase of the predetermined entity.

(8) The information processing apparatus according to (6) or (7),
wherein when expanding content of the response, the application unit generates the response using information on a category of a hierarchy superordinate or parallel to the category indicated by the category tag assigned to the phrase of the predetermined entity.

(9) The information processing apparatus according to any one of (6) to (8),
wherein when the input speech contains content instructing the content of the response to be narrowed down or expanded, the application unit generates the response using the hierarchical structure in accordance with the instruction.

(10) The information processing apparatus according to any one of (6) to (9),
wherein when the input speech does not contain content instructing the content of the response to be narrowed down or expanded, the application unit generates the response selectively using the hierarchical structure in accordance with whether the input speech is first speech or second speech.

(11) The information processing apparatus according to (10),
wherein when the input speech is the first speech, the application unit generates the response without using the hierarchical structure.

(12) The information processing apparatus according to (10) or (11),
wherein when the input speech is the second speech, the application unit determines whether to narrow down or expand the content of the response from a difference between a category tag assigned to the first speech and a category tag assigned to the second speech, and generates the response using the hierarchical structure in accordance with a result of the determination.

(13) The information processing apparatus according to (12),
wherein when a category of the same hierarchy is assigned to the first speech and the second speech, the application unit determines to narrow down the content of the response, and generates the response using information on a category of a hierarchy subordinate to the category indicated by the category tag assigned to the phrase of the predetermined entity.

(14) The information processing apparatus according to (12) or (13),
wherein when a category of the same hierarchy is not assigned to the first speech and the second speech, the application unit determines to expand the content of the response, and generates the response using information on a category of a hierarchy superordinate or parallel to the category indicated by the category tag assigned to the phrase of the predetermined entity.

(15) An information processing method, including;
assigning a category tag to each of terms in input speech for all of categories when the terms are registered in a knowledge information dictionary;
estimating a domain of speech content intended by the input speech and extracting a term pertaining to the estimated domain from the input speech as a phrase of a predetermined entity; and
generating a response on the basis of the domain and the phrase of the predetermined entity,
wherein the knowledge information dictionary has a hierarchical structure, and in the generating, the response is generated using the hierarchical structure.

REFERENCE SIGNS LIST

10 Information processing system
100 Dialogue agent
101 Control unit
102 Input/output interface
103 Operation input device
104 Microphone
105 Speaker
106 Display
107 Communication interface
108 Rendering unit
109 Bus
200 Cloud server
201 Control unit
202 Storage unit
203 Communication interface
204 Voice recognition unit
205 Language processing unit
206 Knowledge information dictionary
207 Speech semantic analysis unit
208 Domain estimator
209 Entity extractor
210 Application unit
300 Network

The invention claimed is:

1. An information processing apparatus, comprising:
a central processing unit (CPU) configured to:
assign a category tag to each of terms in input speech for all of categories when the terms are registered in a knowledge information dictionary;
estimate a domain of speech content intended by the input speech and extracts a term pertaining to the estimated domain from the input speech as a phrase of a specific entity;
generate a response based on the domain and the phrase of the specific entity, wherein
when the input speech does not contain content instructing content of the response to be narrowed down or expanded, the response is generated selectively using a hierarchical structure of the knowledge information dictionary based on whether the input speech is first speech or second speech, and
when the input speech is the second speech, the response is generated using the hierarchical structure, based on determination of whether to narrow down or expand the content of the response, wherein whether to narrow down or expand the content of the response is determined from a difference between a category tag assigned to the first speech and a category tag assigned to the second speech; and
register, when a category tag is not assigned to the phrase of the specific entity, the phrase of the specific entity for a category corresponding to the specific entity in the knowledge information dictionary.

2. The information processing apparatus according to claim 1,
wherein when estimating the domain of the speech content intended by the input speech, the CPU is further configured to estimate the domain based on the category tag assigned to the term in the input speech.

3. The information processing apparatus according to claim 1,
wherein when the CPU correctly generates the response, the CPU is further configured to register the phrase of the specific entity.

4. The information processing apparatus according to claim 1, wherein
the CPU is further configured to register, along with the category corresponding to the specific entity in the knowledge information dictionary, the phrase of the specific entity for each of hierarchical categories superordinate to the category.

5. An information processing method, comprising:
assigning a category tag to each of terms in input speech for all of categories when the terms are registered in a knowledge information dictionary;
estimating a domain of speech content intended by the input speech and extracting a term pertaining to the estimated domain from the input speech as a phrase of a predetermined specific entity;
generating a response based on the domain and the phrase of the specific entity, wherein
when the input speech does not contain content instructing content of the response to be narrowed down or expanded, the response is generated selectively using a hierarchical structure of the knowledge information dictionary based on whether the input speech is first speech or second speech, and
when the input speech is the second speech, the response is generated using the hierarchical structure, based on determination of whether to narrow down or expand the content of the response, wherein whether to narrow down or expand the content of the response is determined from a difference between a category tag assigned to the first speech and a category tag assigned to the second speech; and registering, when a category tag is not assigned to the phrase of the specific entity, the phrase of the specific entity for a category corresponding to the specific entity in the knowledge information dictionary.

6. An information processing apparatus, comprising:

a central processing unit (CPU) configured to:

assign a category tag to each of terms in input speech for all of categories when the terms are registered in a knowledge information dictionary;

estimate a domain of speech content intended by the input speech and extracts a term pertaining to the estimated domain from the input speech as a phrase of a specific entity; and generate a response based on domain and the phrase of the specific entity, wherein the knowledge information dictionary has a hierarchical structure, when the input speech does not contain content instructing content of the response to be narrowed down or expanded, the response is generated selectively using the hierarchical structure of the knowledge information dictionary based on whether the input speech is first speech or second speech, and when the input speech is the second speech, the response is generated using the hierarchical structure, based on determination of whether to narrow down or expand the content of the response, wherein whether to narrow down or expand the content of the response is determined from a difference between a category tag assigned to the first speech and a category tag assigned to the second speech.

7. The information processing apparatus according to claim 6, wherein when narrowing down the content of the response, the CPU is further configured to generate the response using information on a category of a hierarchy subordinate to a category indicated by a category tag assigned to the phrase of the specific entity.

8. The information processing apparatus according to claim 6, wherein when expanding content of the response, the CPU is further configured to generate the response using information on a category of a hierarchy superordinate or parallel to a category indicated by a category tag assigned to the phrase of the specific entity.

9. The information processing apparatus according to claim 6, wherein when the input speech contains content instructing the content of the response to be narrowed down or expanded, the CPU is further configured to generate the response using the hierarchical structure based on an instruction.

10. The information processing apparatus according to claim 6, wherein when the input speech is the first speech, the CPU is further configured to generate the response without using the hierarchical structure.

11. The information processing apparatus according to claim 6, wherein when a category of a same hierarchy is assigned to the first speech and the second speech, the CPU is further configured to:

determine to narrow down the content of the response; and generate the response using information on a category of a hierarchy subordinate to a category indicated by a category tag assigned to the phrase of the specific entity.

12. The information processing apparatus according to claim 6, wherein when a category of a same hierarchy is not assigned to the first speech and the second speech, the CPU is further configured to:

determine to expand the content of the response; and generate the response using information on a category of a hierarchy superordinate or parallel to a category indicated by a category tag assigned to the phrase of the specific entity.

13. An information processing method, comprising:

assigning a category tag to each of terms in input speech for all of categories when the terms are registered in a knowledge information dictionary;

estimating a domain of speech content intended by the input speech and extracting a term pertaining to the estimated domain from the input speech as a phrase of a specific entity; and generating a response based on the domain and the phrase of the specific entity, wherein the knowledge information dictionary has a hierarchical structure, when the input speech does not contain content instructing content of the response to be narrowed down or expanded, the response is generated selectively using the hierarchical structure of the knowledge information dictionary based on whether the input speech is first speech or second speech, and when the input speech is the second speech, the response is generated using the hierarchical structure, based on determination of whether to narrow down or expand the content of the response, wherein whether to narrow down or expand the content of the response is determined from a difference between a category tag assigned to the first speech and a category tag assigned to the second speech.

* * * * *